UNITED STATES PATENT OFFICE.

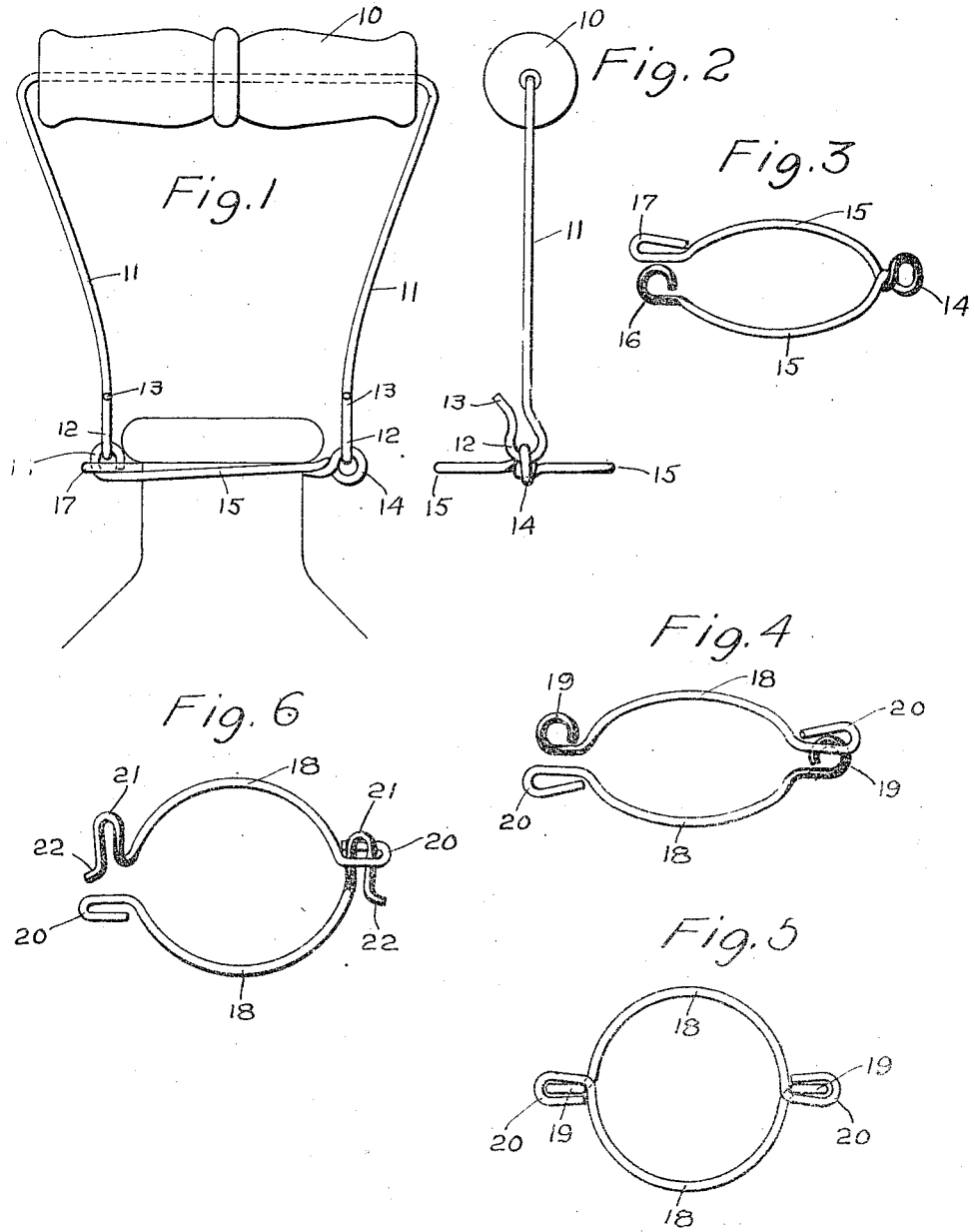

EZRA LAWRENCE, OF OAKVILLE, CONNECTICUT, ASSIGNOR TO THE BAIRD MACHINE COMPANY, OF OAKVILLE, CONNECTICUT, A CORPORATION OF CONNECTICUT.

BOTTLE-CARRYING HANDLE.

1,013,406.  Specification of Letters Patent.  Patented Jan. 2, 1912.

Application filed April 4, 1911. Serial No. 618,966.

*To all whom it may concern:*

Be it known that I, EZRA LAWRENCE, a citizen of the United States, residing at Oakville, county of Litchfield, State of Connecticut, have invented an Improvement in Bottle-Carrying Handles, of which the following is a specification.

This invention has for its object to provide an inexpensive carrying handle for large sized bottles, as mineral water and milk bottles, which may be easily and quickly attached and detached and which cannot become detached in ordinary usage but can only be detached by manipulation in a special manner.

With these and other objects in view I have devised the novel bottle carrying handle which I will now describe referring to the accompanying drawing forming a part of this specification and using reference characters to indicate the several parts.

Figure 1 is an elevation of my novel handle in place on a bottle neck; Fig. 2 an end view as seen from the right in Fig. 1, the bottle being omitted; Fig. 3 a perspective of a form of attaching clip made from a single piece of wire; Fig. 4 a perspective of an attaching clip comprising two corresponding parts, the parts being detached; Fig. 5 a plan view corresponding therewith, the parts being in the assembled position; and Fig. 6 is a perspective illustrating a variant form of two-part attaching clip, the parts being partly assembled.

My novel handle comprises two members, viz: a bail or handle proper and the attaching clip. The bail or handle comprises a straight central portion, which carries a hand piece 10 made of wood, compressed fiber or any suitable material, and arms 11 each of which is provided with a hook 12 adapted to engage an eye upon the attaching clip, the bail and the clip when assembled acting to retain each other in place.
The hooks are preferably provided with outwardly turned extensions 13 for convenience in connecting the hooks with the eyes and which act to prevent detachment unless the bail is especially manipulated in order to detach it.

The form of attaching clip illustrated in Figs. 1, 2 and 3 is formed from a single piece of wire having an eye 14 formed at its mid-length by bending the wire and having arms 15 lying in a plane at right angles to the eye and adapted to inclose a bottle neck, one of said arms being provided at its ends with an eye 16 lying parallel with eye 14 and the other with a loop 17 lying in a plane at right angles to the eye through which the eye passes, as clearly shown in Fig. 1. When in this position, eyes 14 and 16 may be engaged by the hooks on the bail and when engaged will remain so under the ordinary conditions of use, the hooks and eyes acting respectively to retain the bail and the handle in the assembled position and in place on the neck of a bottle, as shown.

In the form illustrated in Figs. 4 and 5, the attaching clip comprises two corresponding parts, each consisting of an arm 18 adapted to half inclose a bottle neck and having at one end an eye 19 corresponding with the eyes in the other form and at the other end a loop 20 in a plane at right angles to the eye through which the eye of the other part passes from below upward. To assemble and attach the parts, they are placed slightly out of parallel on opposite sides of a bottle neck with the loops above the eyes, then the eyes are passed upward through the loops and then the hooks are engaged with the eyes as before.

The form illustrated in Fig. 6 differs from the form last described only in that instead of an eye 19 at one end of each arm I provide in lieu thereof an eye 21 open at the bottom and having an outwardly turned end 22. The only difference in the operation of these two forms is that the outwardly turned ends of eyes 21 prevent the possibility of an eye passing entirely through the corresponding loop. The members are closed about a bottle neck, connected together and the hooks of the bail are engaged with the eyes as in the other forms.

In all forms of the invention the clips are formed of resilient material and it will be clear that when the bail is disengaged from the clips, their interlocked ends can be separated so that the clips can be removed from the bottle without bending the said clips or necessitating the use of tools. The separating of the interlocked ends of the clips is due to the fact that as shown in Fig. 3 the eye 14 is formed by twisting the material and when the eye 16 is passed through the loop 17, it is necessary to flex one of the arms 15 beneath the other arm, and when the bail is released from the eye

16, the arms 15 can be readily depressed to remove the eye from the loop so that said arms will assume their original positions. In the two-part clips, shown in Figs. 4, 5 and 6, it is necessary to flex the sections so that the end loops 20 overlap the end eyes 19, to permit said eyes to be passed through said loops. To release the sections, one end of one section is depressed so that the eye will slide through the loop.

Having thus described my invention I claim:

1. A bottle carrier comprising a clip formed of resilient material adapted to embrace a bottle neck, said clip having one free end provided with an eye and another free end provided with a loop for overlapping said eye to permit the eye to be passed therethrough, said clip being provided with a second eye, diametrically opposite the first eye, and a bail adapted to engage said eyes to retain the clip about the neck of a bottle.

2. A bottle carrier comprising a resilient clip formed of two sections, each section having an end eye and an end loop, the loops and eyes being arranged at right angles so that the eye of one section can be passed through the loop of the other section and to permit said section to be separated by moving the end of one section relative to the other section, and a bail having end hooks for engaging the eyes to retain the sections about a bottle neck.

3. A bottle carrying handle comprising a two-part attaching clip each part adapted to partly inclose a bottle neck and having at one end an eye open at the bottom and having an outwardly turned end, for the purpose set forth, and at the other end a loop at right angles to the eye through which the eye on the other part passes and a bail having hooks adapted to engage the eyes and retain the parts in place.

In testimony whereof I affix my signature in presence of two witnesses.

EZRA LAWRENCE.

Witnesses:
L. C. HOBART,
CHAS. L. WARNER.